July 30, 1957 F. TRINCA 2,800,795
TIRE PRESSURE INDICATING MEANS
Filed Feb. 10, 1954 2 Sheets-Sheet 2

INVENTOR:
Frederick Trinca,
BY
ATTORNEY.

United States Patent Office 2,800,795
Patented July 30, 1957

2,800,795

TIRE PRESSURE INDICATING MEANS

Frederick Trinca, Middle Village, N. Y.

Application February 10, 1954, Serial No. 409,383

2 Claims. (Cl. 73—390)

This invention relates to pneumatic tire pressure gages, and particularly to improvements in gages of that type shown in a prior application filed by me wherein a gage, connected to the air space of a tire carried by a vehicle rim, is mounted on the wheel body or the hub cap so as to be readily visible and operable to give an indication of the tire pressure at any and all times, to enable a motorist to take measures whenever necessary to correct the pressure condition of an overinflated or an underinflated tire.

One object of the present invention is to provide an improved construction of gage giving greater efficiency of operation and furnishing greater convenience to the motorist in making observations to determine the pressure condition of the tire.

A further object of the invention is to provide a gage which may be mounted on the body or hub cap of a wheel coaxially or in line with the wheel axis on its dead center in order to prevent the development of objectionable stresses or strains in the wheel due to centrifugal force when the wheel is in motion.

Still another object of the invention is to provide a gage of this character which may be readily connected with the air space of the tire and also employed in conjunction with an inflating valve stem located adjacent the wheel center or located in the conventional manner in proximity to the wheel rim as may be found most convenient in use.

With these and other objects in view, which will appear in the course of the subjoined description, the invention consists of the novel features of construction, combination and arrangement of parts hereinafter fully described and claimed, and as exemplificatively shown in the accompanying drawings, in which:

Figure 4 is a view in elevation of the parts shown in Figure 1 looking toward the same from the outer side thereof.

Figures 7 and 8 are fragmentary views similar to Figures 1 and 4 showing a modified mode of mounting the pressure gage.

Figure 1:
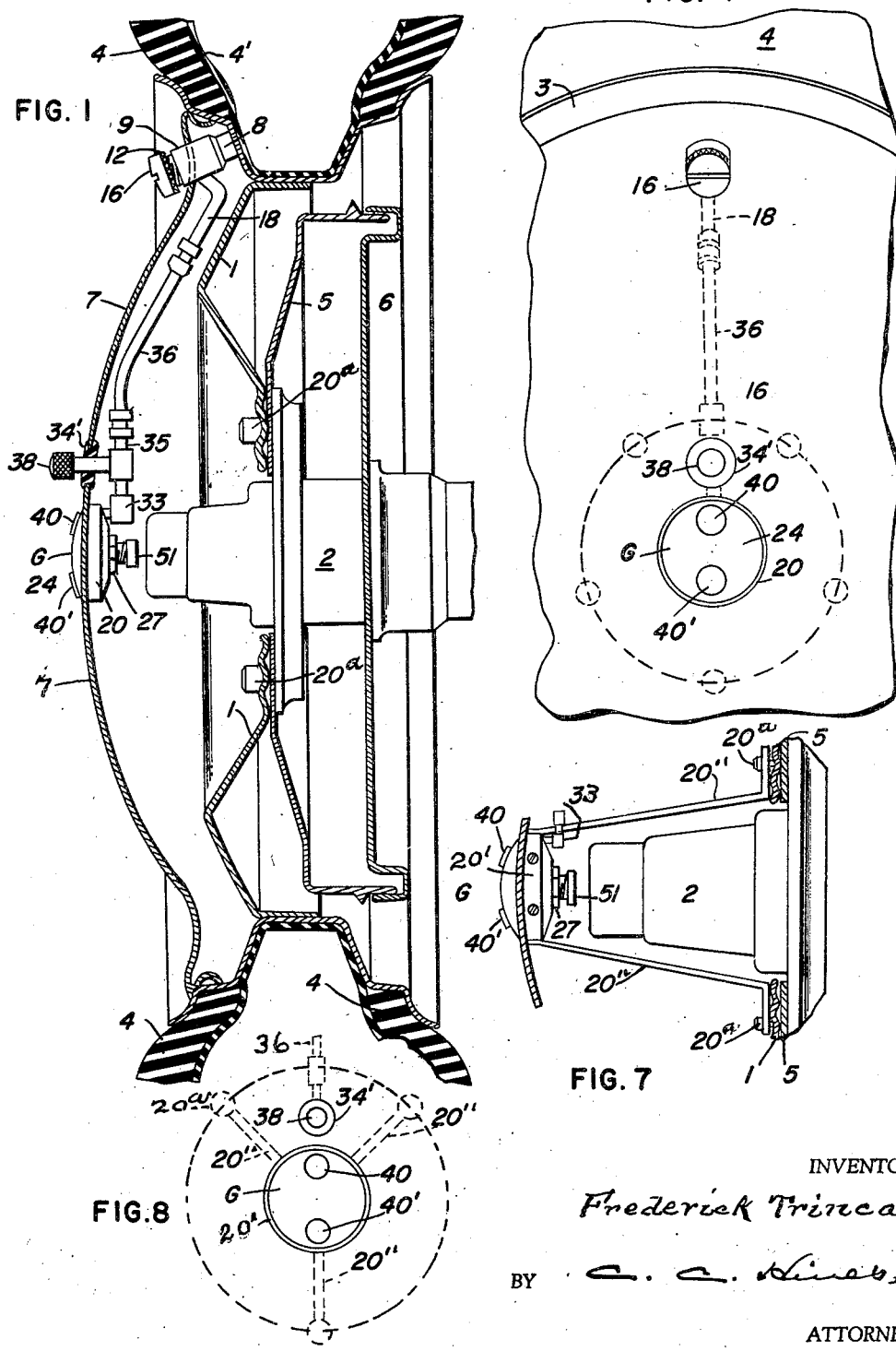
Figure 1 is a central vertical section through a portion of a vehicle wheel and a tire mounted thereon, showing an application of the invention thereto in which the gage is mounted on the hub cap.

Referring now more particularly to the drawings, 1 represents a wheel body of an automobile or like vehicle wheel fixed to and rotatable with its hub 2, and carrying a channeled rim 3 in which is mounted a pneumatic tire 4 which may be of any conventional type. The body supports a brake drum 5 closed at its inner side by the usual cover or back plate 6 mounted in practice on the wheel housing, which parts may also be of conventional type. The wheel body structure shown includes a detachable hub cap or outer cover plate 7, removably secured in place by any suitable fastening or retaining means. The tire 4 shown has an inner tube 4' provided with a tapered nipple 8 which projects outwardly through a hole in the rim 3 and fits within the inner end of a coupling sleeve 9 which projects at its outer end through a hole in the hub cap and is counterbored at its outer end to receive a metallic washer 10, a rubber washer or gasket 11 and the inner end of a clamping nut 12. Fitted at its inner end in the nipple 8 is a tubular valve stem 13 provided with the usual tire inflating and deflating valve means including the valve pin 15 and closure cap 16. The stem 13 is externally threaded at its outer end to receive the cap, which has an elongated sleeve portion formed to fit between the stem and nut 12 and internally threaded to engage the threads of the nut. The nut 12 is adjustable to effect a tight sealing engagement between the nipple, stem and sleeve at the inner end of the fitting and to cause the washer 10 to compress the gland 11 to effect a tight seal between the parts named at the outer end of the fitting. Between the nipple and gland the stem is spaced from the sleeve and provided with an opening 17 connecting said space with the nipple and tire and with a conducting elbow 18 formed on the sleeve through which air may flow between the tire and the gage, as hereinafter described. The cap 16 carries a release pin or projection 19 engageable with the valve pin 15 to hold the inflating valve closed when not in use. The arrangement of this inflating valve device accords with that used with many wheels and tires, and it provides an arrangement which may be used for tire inflation and deflation if so desired by the motorist.

Figure 2:
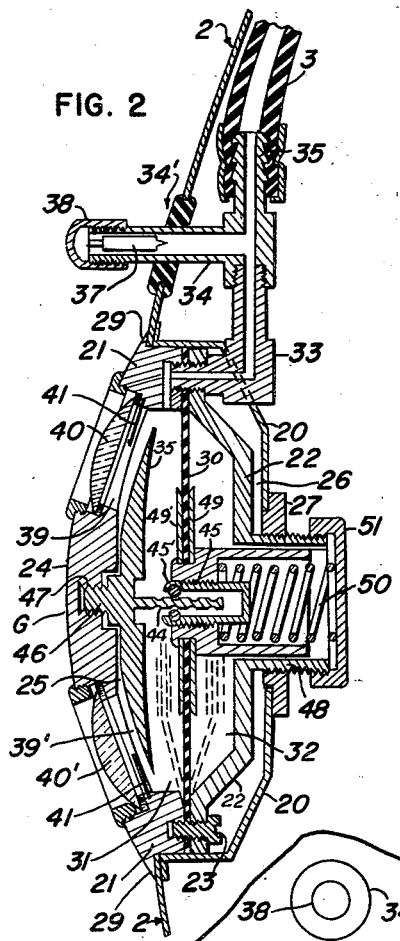
Figure 2 is an enlarged vertical section through the gage and portions of the wheel body to which it is attached.
Figure 3:
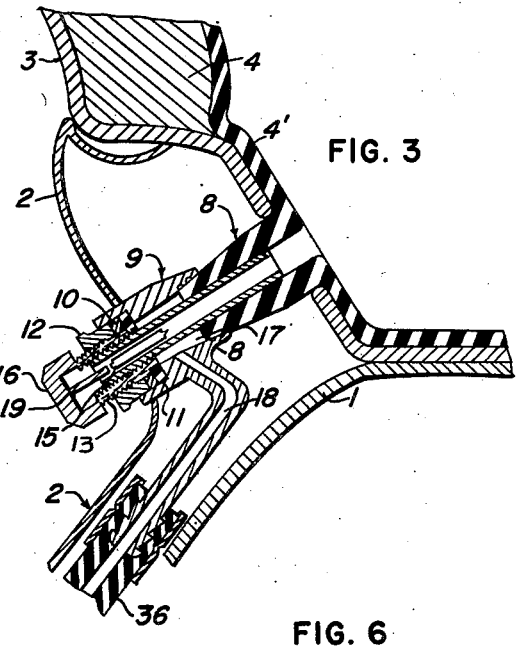
Figure 3 is a sectional view similar to Fig. 2 through a portion of the wheel body, rim and tire, showing particularly the elements of the tire inflating means connected with the tire through the wheel rim.
Figure 6:
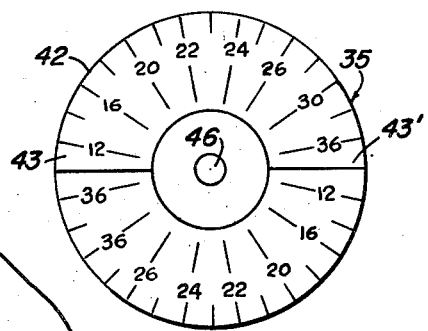
Figure 6 is a face view of the indicating dial.
Figure 5:
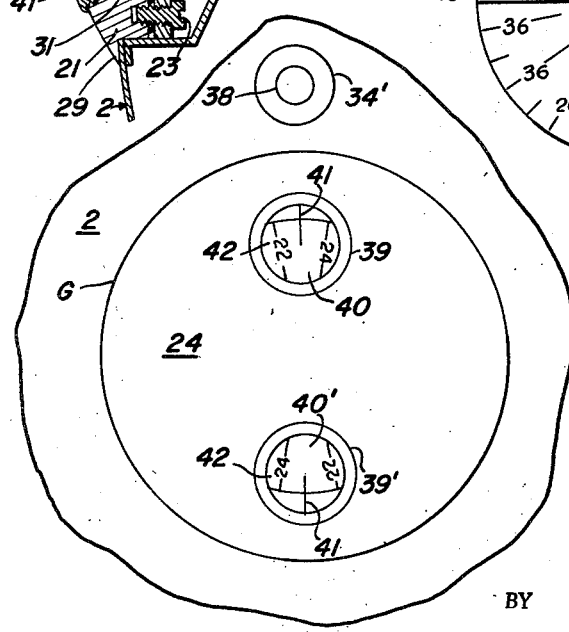
Figure 5 is a face view of a part of the hub cap and pressure gage.

The pressure indicating gage G is or may be directly mounted on the disk body 1, or on the hub cap 7, considered as forming part of the wheel body, in the region of the hub or axis of rotation of the wheel. In Figs. 1, 2 and 4, it is shown as mounted in an inset seat pocket or holder 20 formed to fit in an opening in the hub cap adjacent to the outer end of the hub and in the dead center line of the axis of rotation of the wheel. The purpose of this arrangement is to dispose the gage where its pressure will not set up objectionable stresses or strains in the wheel due to centrifugal force when the wheel is rotating, and also where it may be most conveniently inspected from any angle by a person standing along side the wheel. The holder may be secured to the hub cap and the gage may be secured to the holder in any suitable manner to adapt the gage to be applied to and removed from the wheel body with or separate from the hub cap. This mode of supporting the gage allows ready removal and replacement of the hub cap or gage without the expenditure of any material amount of time or labor. The gage comprises a body of generally circular outline form and consisting of front and rear sections 21 and 22 detachably united, as by a suitable number of screws or other suitable fastenings 23. The front section 21 is of concavo-convex form, having a convex front face 24 and a concaved rear face 25, while the rear section 22 is of dished form with its dished side facing forwardly and its flat bottom 26 facing rearwardly and provided with an externally threaded guide sleeve 27. The gage is held seated in the pocket 20 by a nut 28 engaging the threaded surface of the sleeve 27 and an opening in the back of the pocket, the nut also acting to hold a peripheral flange 29 on the front section clamped against the front face of the hub cap.

A flexible diaphragm 30 is peripherally clamped between the casing sections and divides the casing into a front pressure character 31 and a rear diaphragm clearance chamber 32. The pressure chamber 31 is in communication through a coupling fitting 33 with the inner end of a second inflating valve stem 34 having a nipple 35 between which and the elbow 18 of the sleeve 9 of the inflating stem 13 extends, in a direction radially of the wheel, a conductor 36, preferably a hose pipe, which connects both valve stems together, and thus connects both inflating devices with the air space of the tire and the pressure chamber 31. The stem 34 projects outwardly through a grommet 34' fitted in the hub cap adjacent to the gage and is provided with check valved inflating means 37 and a closure cap 38 of conventional type. The inner valve stem 34 may be used in place of the valve stem 13 to inflate or deflate the tire if, according to wheel position or other conditions, it is found more convenient to do so, and either inflating device may be used in the event of damage to the other or incapacity of the other at the time.

Formed in the front section 24 of the gage casing are two sight openings 39, 39' arranged 180° apart in the direction of rotation of the wheel, and each closed by a lens 40, 40' through which the chamber 31 may be viewed. In this chamber are stationary indicators 41 disposed between the respective lenses and a rotary dial 42. This dial is arranged in the chamber 31 immediately in view of the front casing section and is in the form of a concavo-convex disk, the convex side of which faces the front casing section and is provided on opposite sides of two radial lines 43, 43' with similar sets of indicia, such as other radial lines and associated pressure indicating numerals consisting, for example, of the numerals 20, 22, 24, 26, 30, and 36, and intermediate unnumbered lines, indicating pressures within a predetermined low range and a predetermined normal range and a predetermined high range. Two sight lenses and two sets of pressure indicating lines and numerals are preferably employed so that at least one will be clearly visible to a person looking from a nearby point and from any angle toward the other side of the wheel. The dial is rotated in one direction or the other by means actuated by the diaphragm to bring a numeral of a set into registry with the cooperating fixed indicator 41 to enable the motorist to tell by visual observation at any time the amount of pressure of the air contained in the tire, with a saving of time and labor over customary ways of obtaining such information. The indicating lines 43, 43' may be colored red to warn the motorist that a dangerous low or high pressure condition has been or is about to be reached, so that the motorist will be advised in proper time to take corrective measures.

The means employed for actuating the dial from the diaphragm is preferably of the spiral drive type shown, comprising a helically or spirally grooved impeller shaft 44 projecting rearwardly from the dial, an impeller sleeve or tube 45 carried by the diaphragm and extending rearwardly in the chamber 32, teeth 45' in the form of antifriction balls engaging the grooves of shaft 44, and a threaded hub shaft 46 projecting forwardly from the dial and engaging a threaded socket 47 formed in the front section of the gage body. The sleeve 45 is carried by a follower sleeve 48 movable in the guide sleeve 27 and fixed at its forward end to stiffening disks or plates 49 secured to the diaphragm. The diaphragm is movable rearwardly under air pressures in the chamber 31 against the counteracting resistance of a spring 50 housed in the follower 48 and sleeve and bearing at its forward end against the forward end of the follower and at its rear end against a threaded cap 51 engaging the guide sleeve 27, whereby the open rear end of the guide sleeve is closed and whereby the pressure of the spring may be regulated by adjustment of the cap as may be required to normally counteract the force of the air pressure. As the diaphragm is moved in one direction or the other by the air pressure or the spring pressure, the antifriction bearing members transmit motion to the shaft 44 which is rotated and moved forwardly or rearwardly by the spiral driving connection, thus bringing the proper pressure indicating members on the dial into registry with the fixed indicators and into view through the windows. As the shaft 44 moves longitudinally and rotates the dial plate the stub shaft 46 turns in the socket 47 to permit of such movements of the shaft 44 and dial and its threads frictionally engage the threads of the socket to set up a braking force which prevents overthrow of the dial.

From the foregoing description, taken in connection with the drawings, the construction and mode of operation of the invention will be readily understood, and it will be seen that when the tire pressure varies from the normal the dial will be turned in one direction or the other to indicate overinflation or underinflation, and its extent. Thus by reason of the position of the gage and the use of the two indicating tables a pressure indicated reading may be easily obtained in any position of rotation of the wheel by a person standing alongside it, and a warning notice will be given at the same time if, and when an undesirably high or low pressure condition exists, so that correction measures may be taken to avoid possible tire trouble. Also, the construction and arrangement of gage and connections employed avoids the setting up of stresses from centrifugal force in the running of the wheel and allows use of the gage with a conventionally located valve stem and the employment of a second valve stem, if desired, so that inflation or deflation of the tire, when required, may be carried out at the most convenient point at the time, and, in the event that one of the stems should become unusable from any cause, the other may be used. Furthermore, the gage and its connections may be quickly and easily applied to any wheel at a low cost, and the use of such a gage on each wheel of a vehicle will enable the motorist to secure, at any time, information with regard to the pressure conditions of his tires without the loss of time and trouble in conducting tests in the usual way.

Figs. 7 and 8 show a modified mode of mounting the gage in which a holder or bracket 20' of the form shown or otherwise suitably formed is secured to the gage casing and provided with arms 20" extending therefrom to the wheel hub and fastened to the hub by the wheel lug bolts 20ᵃ, by which the gage is supported in line with the wheel axis and independently of the hub cap, allowing the hub cap and gage to be separately applied and removed and the gage to be firmly supported on the wheel.

While the construction of parts herein disclosed for carrying my invention into practice is preferred, it is to be understood that the invention is not limited thereto, and that changes in the form, construction and arrangement of the parts, falling within the scope of the appended claims, may be made without departing from the spirit or sacrificing any of the advantages of the invention.

Having thus described my invention, I claim:

1. A pneumatic tire pressure gage comprising a casing having a concavo-convex front wall portion provided with a plurality of sight panels, a diaphragm in the casing, means for subjecting the diaphragm to the pressure of air in the tire and an opposing pressure, a concavo-convex indicating dial operatively connected to and rotatable in opposite directions by movements of the diaphragm from a normal position under variations of pressure from a predetermined normal pressure, said dial having a convex dial face disposed adjacent the inner concaved side of the front wall and visible through the panels and provided with a plurality of sets of indicia located on opposite sides of a diametrical line extending across said face and each indicating a normal pressure and relatively higher and lower pressures brought into indicating position by opposite movements of the dial when said pressures vary.

2. A pneumatic tire pressure gage comprising a casing having a concavo-convex front wall portion provided with a plurality of sight panels, a diaphragm in the casing, means for subjecting the diaphragm to the pressure of air in the tire and an opposing pressure, a concavo-convex indicating dial operatively connected to and rotatable in opposite directions by movements of the diaphragm from a normal position under variations of pressure from a predetermined normal pressure, said dial having a convex dial face disposed adjacent the inner concaved side of the front wall and visible through the panels and provided with a plurality of sets of indicia located on opposite sides of a diametrical line extending across said face and each indicating a normal pressure and relatively higher and lower pressures brought into indicating position by opposite movements of the dial when said pressures vary, said diametrical line being of a distinctive appearance and comprising portions indicating undesirably high and low pressures.

References Cited in the file of this patent
UNITED STATES PATENTS

| | | |
|---|---|---|
| 1,216,192 | Weinandt | Feb. 13, 1917 |
| 1,621,759 | Snell | Mar. 22, 1927 |
| 2,168,145 | Willis | Aug. 1, 1939 |
| 2,190,530 | Clarkson | Feb. 13, 1940 |
| 2,437,371 | Allen | Mar. 9, 1948 |
| 2,550,041 | Cozzolino et al. | Apr. 24, 1951 |
| 2,630,013 | Schier | Mar. 3, 1953 |